L. G. McKAM.
SAW SWAGE AND SHAPER.
APPLICATION FILED APR. 2, 1909.

992,135.

Patented May 9, 1911.

3 SHEETS—SHEET 1.

Witnesses
Clarence E. Day
Alice Townsend.

Inventor
Lawrence G. McKam
By Parker & Burton
Attorneys

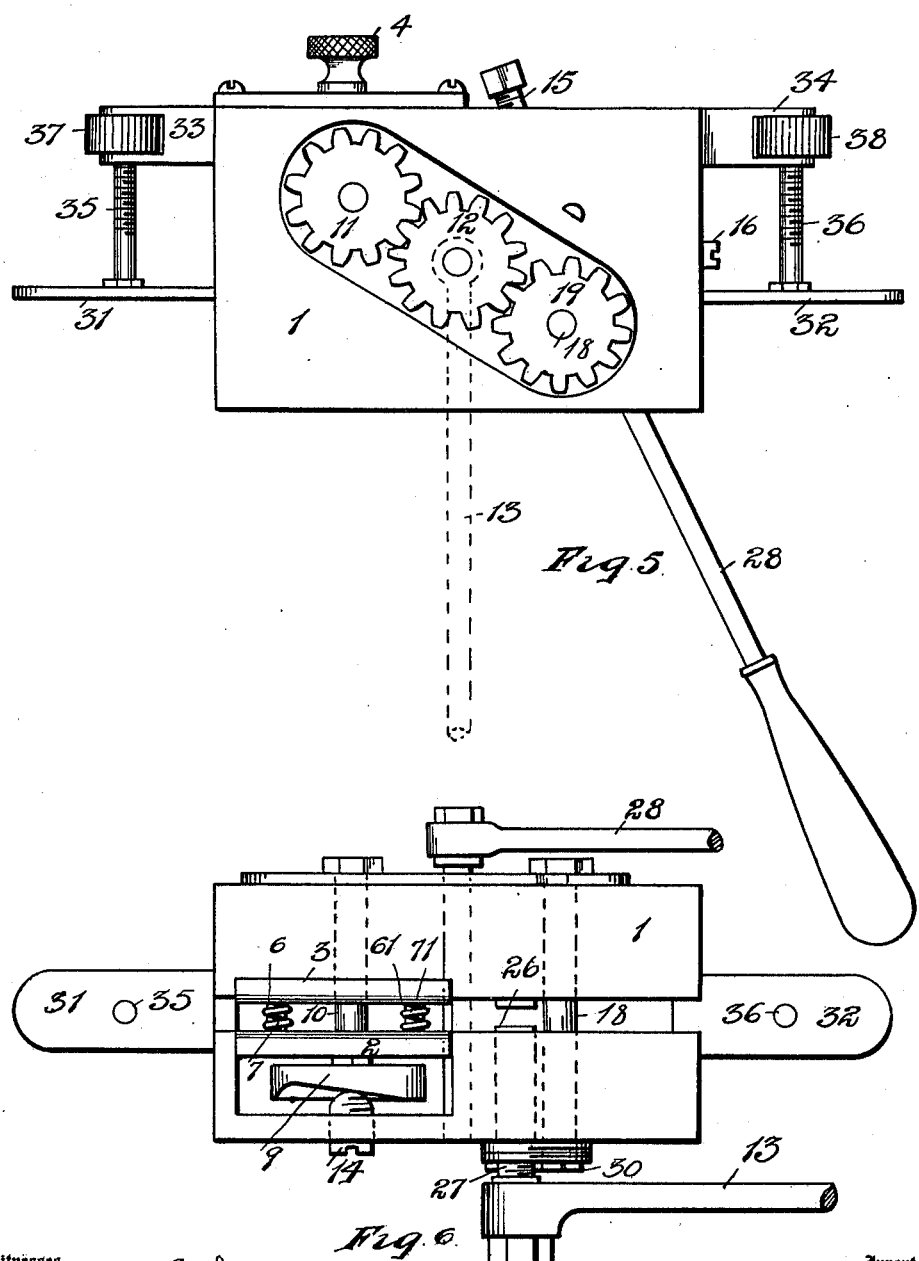

L. G. McKAM.
SAW SWAGE AND SHAPER.
APPLICATION FILED APR. 2, 1909.

992,135.

Patented May 9, 1911.

3 SHEETS—SHEET 3.

UNITED STATES PATENT OFFICE.

LAWRENCE G. McKAM, OF DETROIT, MICHIGAN, ASSIGNOR TO THE STANDARD SAW MANUFACTURING COMPANY, OF DETROIT, MICHIGAN, A CORPORATION OF MICHIGAN.

SAW SWAGE AND SHAPER.

992,135.  Specification of Letters Patent.  Patented May 9, 1911.

Application filed April 2, 1909. Serial No. 487,531.

*To all whom it may concern:*

Be it known that I, LAWRENCE G. McKAM, a citizen of the United States, residing at Detroit, county of Wayne, State of Michigan, have invented a certain new and useful Improvement in Saw Swages and Shapers, and declare the following to be a full, clear, and exact description of the same, such as will enable others skilled in the art to which it pertains to make and use the same, reference being had to the accompanying drawings, which form a part of this specification.

This invention relates to saw swages and shapers; it has for its object an improved swage and shaping implement, in which the shaping of one tooth, and the swaging of another, is accomplished simultaneously by the actuation of a single lever.

Figure 2:
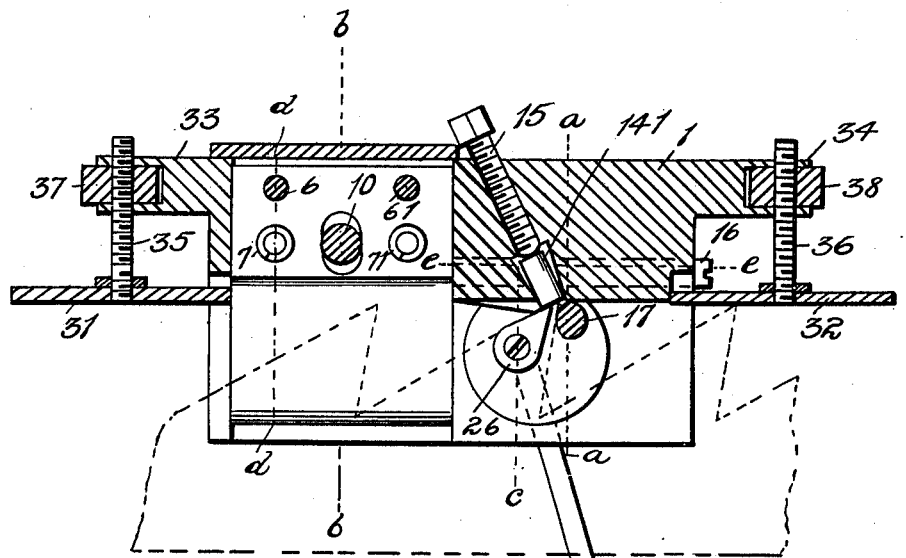
Figures 3, 4:
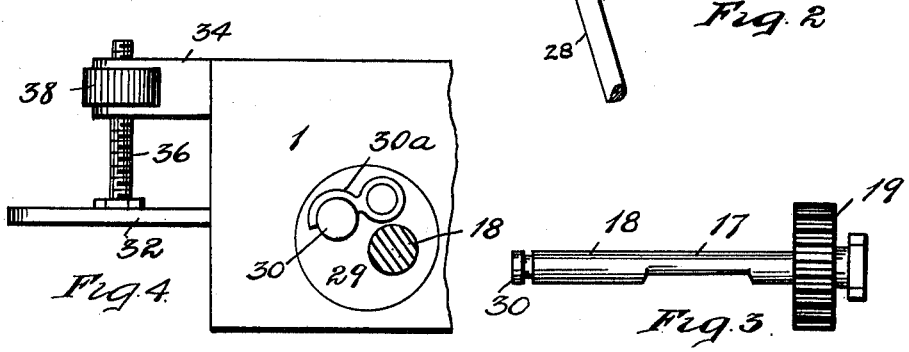
Figure 1:
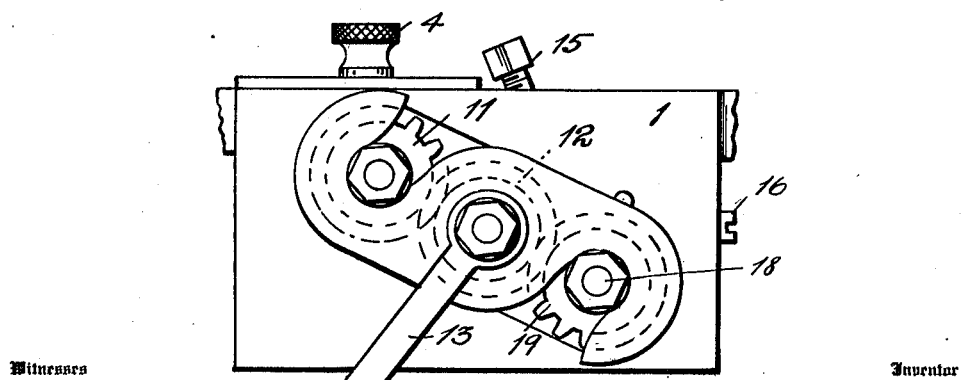
Figure 8:
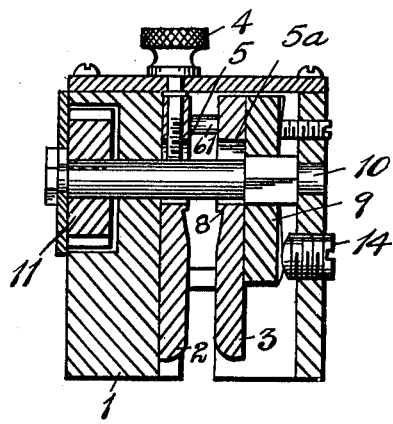
Figure 7:
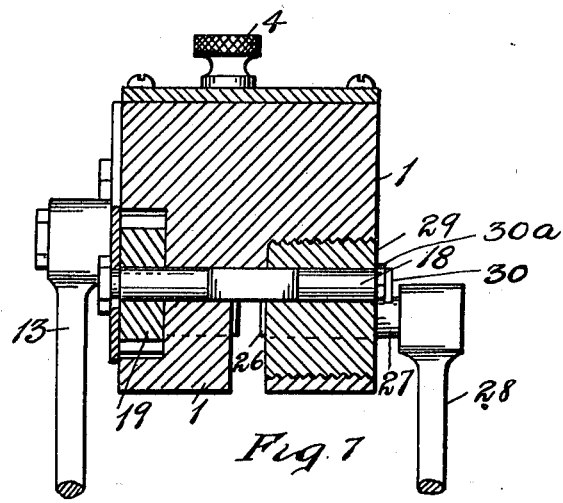
Figure 9:
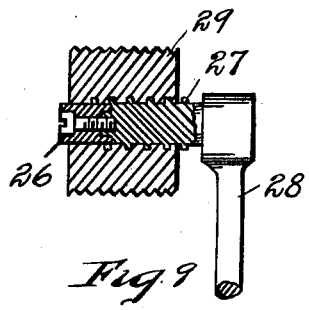
Figure 10:
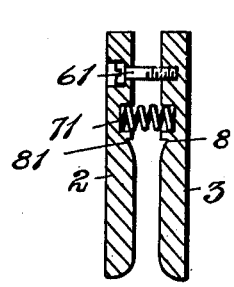
Figure 11:
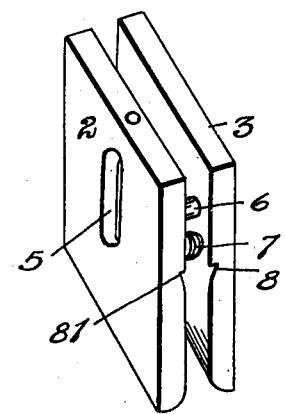
Figure 12:
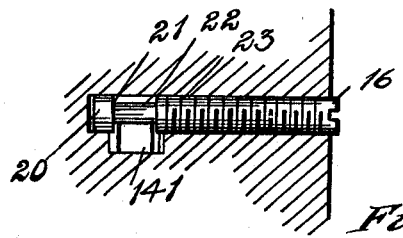

In the drawings:—Figure 1, is a side elevation of the middle part of the tool. Fig. 2, is a longitudinal vertical section of the entire tool. Fig. 3, is an elevation of the swaging roll. Fig. 4, is a side elevation of the reverse side of the tool, showing one end thereof. Fig. 5, is a side elevation of the tool with the gear cover removed. Fig. 6, is a view of the under side of the tool. Fig. 7, is a cross section at the line $a$—$a$ of Fig. 2. Fig. 8, is a cross section at the line $b$—$b$ of Fig. 2. Fig. 9, is a cross section at the line $c$ of Fig. 2. Fig. 10, is a cross section of the clamp box at the line $d$—$d$ of Fig. 2. Fig. 11, is a perspective of the clamp box. Fig. 12, is a horizontal longitudinal section at the line $e$—$e$ of Fig. 2.

The body of the tool consists of a single block of metal grooved lengthwise and bored or drilled to receive the shaft, screws, rolls, and clamps which go to make up the entire tool. The body block 1 is grooved on its under side for the reception of the saw blade. At the shaping end which appears at the left in Fig. 2, the groove is continued as a slot entirely through the block, and is widened, and in the chamber thus formed are inserted two shaping blocks 2 and 3. These shaping blocks are adjustable vertically by means of a screw 4, which passes through the upper part of the block 2 into the cross passage 5, which cross passage 5 registers with the cross passage 5ª on the companion block. The two blocks 2 and 3 are held in register by pins 6 and 61, which pins project from one of said blocks and pass through a hole in the other of said blocks; preferably they are made in the form of short screws, whose heads are sunk into counter-sunk cavities in one of the blocks, and whose threaded portion projects into the companion block. The two blocks 2 and 3 are spread or spaced by springs 7 and 71, the ends of which springs are received in cavities on the inner faces of said blocks; the blocks themselves have their inner faces grooved longitudinally with grooves 8 and 81, which are the die forms for shaping the tooth, and the block 3 is adapted to be forced sidewise by a cam 9 actuated in rotation immediately by its shaft 10 and mediately by a gear wheel 11, gear wheel 12, and crank 13. The face of the cam 9 engages against an adjustable bearing screw 14, which coacts with the cam face to push the block 3 bodily over toward the block 2, forcing the tooth in front of itself, and giving to the tooth the proper shape. The shape given to the tooth is produced by crowding the pointed part thereof into the cavities 8, 81, and finishing the shaping of the swage.

That part of the tool which effects the primary swaging is located in and above the groove at that end of the tool which is shown at the right in Fig. 2. It consists of an anvil 141 held in position of adjustment with respect to the tool by an adjusting screw 15, and a canting screw 16. The anvil block 141 rests on the high part of the swaging roll 18. The swaging roll is the shaft of gear wheel 19, which meshes with gear wheel 12, and is actuated simultaneously with the shaping part of the tool by the same movement of the lever 13. The anvil 141 is a small prismatic block which may be turned on its axis to present a new anvil face as its face becomes worn and destroyed. The screw 15 abuts against it, and holds it firmly against any yielding motion when the shaft 18 is revolved, and the screw 16 which engages with a horizontal axis and with an actuating part, which consists of a head 20, with a shoulder 21, a neck 22, and a shoulder 23, the neck 22 being a stem of the screw of reduced size between the head 20 and the enlarged screw thread part of the screw. When the point of the saw tooth is first forced into the angle or corner between the anvil 141 and the shaft 18, the cut-away portion 17 of the shaft 18 is the part thereof that engages the saw tooth; when, however, the shaft is turned about its axis the uncut or high portion of the shaft 18 is swung against the saw tooth, thereby effecting the swaging of the tooth, since the anvil has, of course, remained stationary. The anvil block 141 engages between the shoulders 21 and 23, and is capable of considerable adjustment by turning the screw 16 on its axis, the adjustment required here is only slight, and a sufficient adjustment is made in the way described. The saw is gripped tightly against side movement very close to the point where the swaging action is taking place by means of a pressure finger 26 held to the end of a threaded member 27, which is actuated by a hand lever 28. The threads on member 27 have a pitch such that a very small movement of the lever produces the necessary grip on the saw interposed between the pressure finger 26 and the opposite side of the groove. The shaft 27 passes through a block 29 screwed into the main body of the tool, and provided with an eccentric hole for the passage and to form a bearing for the swaging roll 18, which passes through the block, terminates on its projecting end with a head 30, and is held in place by a hook 30ª, pivoted to the block 29, and engaging over the neck behind the head 30.

At each end of the tool are gage members 31 and 32, suspended from brackets 33 and 34 that project from the main body 1 of the tool, and these are adjustable vertically by means of adjusting screws 35 and 36, and nuts 37 and 38, which nuts engage in slots in the bracket, and are held against motion along the longitudinal axis of the screw, but compel the screw itself to move along its own axis through the nuts carrying with it the gage, which it controls.

What I claim is:—

1. In a saw swaging and shaping tool, in combination with a grooved holding block, a blade-clamping member adapted to act transversely of the grooved portion to hold the blade in place therewithin, saw swaging means adapted to successively engage the individual teeth of a saw blade inserted within said groove, and a shaping member adapted to be simultaneously actuated from the same source of power as said swaging means, comprising a pair of shaping blocks yieldingly held spaced from one another within the grooved portion of the holding block, the inner surfaces of said blocks being horizontally grooved from edge to edge, a rotatable shaft engaging through said shaping blocks and the corresponding portion of the holding block, a cam member mounted thereon in position to force one of said blocks and the included portion of the saw blade toward the other block when actuated thereagainst by the rotation of the shaft, and means for varying the vertical adjustment of said blocks with respect to the holding block, substantially as described.

2. In a saw swaging and shaping tool, in combination with a kerfed holding block, means for communicating actuation to a plurality of elements from the same source of power, a tooth swaging shaft rotatably engaging in said holding block transversely of the plane of an inserted saw blade, said shaft being operatively connected with said power-communicating means, and a shaping member comprising a pair of interiorly grooved shaping blocks, yieldingly held spaced from one another within that portion of the holding block traversed by the saw blade, means for vertically adjusting said shaping blocks within the holding block, and a cam member mounted in said holding block in position to force one of said shaping blocks and the included portion of the saw blade toward the other block, said cam member being connected with said power communicating means, whereby it is actuated simultaneously with the tooth-swaging shaft, substantially as described.

In testimony whereof, I sign this specification in the presence of two witnesses.

LAWRENCE G. McKAM.

Witnesses:
ALICE TOWNSEND,
VIRGINIA C. SPRATT.